United States Patent
Visser et al.

(10) Patent No.: US 9,938,017 B2
(45) Date of Patent: Apr. 10, 2018

(54) ENHANCING ENGINE PERFORMANCE TO IMPROVE FUEL CONSUMPTION BASED ON ATMOSPHERIC RAIN CONDITIONS

(71) Applicant: GE Aviation Systems LLC, Grand Rapids, MI (US)

(72) Inventors: Nicholas Visser, Grand Rapids, MI (US); Sridhar Adibhatla, Glendale, OH (US); David Michael Lax, Grand Rapids, MI (US)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 153 days.

(21) Appl. No.: 14/927,709

(22) Filed: Oct. 30, 2015

(65) Prior Publication Data
US 2017/0121027 A1 May 4, 2017

(51) Int. Cl.
| | |
|---|---|
| B64D 31/06 | (2006.01) |
| F02C 9/20 | (2006.01) |
| G01S 13/02 | (2006.01) |
| F02C 9/00 | (2006.01) |
| F02C 9/28 | (2006.01) |

(Continued)

(52) U.S. Cl.
CPC .......... B64D 31/06 (2013.01); F02C 9/00 (2013.01); F02C 9/20 (2013.01); F02C 9/28 (2013.01); F02C 9/54 (2013.01); G01S 13/02 (2013.01); G01S 13/953 (2013.01); F05D 2270/096 (2013.01); F05D 2270/311 (2013.01); F05D 2270/805 (2013.01)

(58) Field of Classification Search
CPC . B64D 31/00; B64D 31/06; F02C 9/00; F02C 9/20; F02C 9/22; F02C 9/26; F02C 9/266; F02C 9/28; G01S 13/00; G01S 13/02; G01S 13/04; G01S 13/06; G01S 7/411; G01S 7/52038; G01S 7/52042
See application file for complete search history.

(56) References Cited

U.S. PATENT DOCUMENTS

| | | |
|---|---|---|
| 2,931,168 A | 2/1981 | Frank et al. |
| 4,710,095 A | 12/1987 | Freberg et al. |

(Continued)

OTHER PUBLICATIONS

Cao et al.,"Analysis of Video Disdrometer and Polarimetric Radar Data to Characterize Rain Microphysics in Oklahoma," Aug. 2008, Journal of Applied Meteorology and Climatology, vol. 47.*
Cao et al., "Analysis of Video Disdrometer and Polarimetric Radar Data to Characterize Rain Microphysics in Oklahoma," Aug. 2008, Journal of Applied Meteorology and Climatology, vol. 47.*
Non-Final Office Action issued in connection with related U.S. Appl. No. 14/927,788 dated Dec. 15, 2016.
GE Related Case Form.

(Continued)

Primary Examiner — Thomas G Black
Assistant Examiner — Sara J Lewandroski
(74) Attorney, Agent, or Firm — GE Aviation Patent Operation; William S. Munnerlyn

(57) ABSTRACT

Systems and methods for enhancing engine performance based on atmospheric rain conditions are provided. For example, a method can include selecting one or more points along a flight path of an aircraft and receiving a radar reflectivity measurement for each of the one or more points obtained using a radar device located on the aircraft. The method can further include determining an estimate of liquid water content for each of the one or more points based at least in part on the radar reflectivity measurements; and controlling at least one component of the aircraft engine (e.g., a variable stator vane) based at least in part on the estimate of liquid water content for at least one of the plurality of points.

14 Claims, 5 Drawing Sheets

(51) Int. Cl.
*F02C 9/54* (2006.01)
*G01S 13/95* (2006.01)

(56) References Cited

U.S. PATENT DOCUMENTS

| | | | | |
|---|---|---|---|---|
| 5,028,929 | A * | 7/1991 | Sand | G01S 13/106 |
| | | | | 342/22 |
| 5,488,375 | A | 1/1996 | Michie | |
| 5,546,183 | A * | 8/1996 | Fegley | G01N 15/0205 |
| | | | | 356/336 |
| 6,283,410 | B1 * | 9/2001 | Thompson | B64D 41/00 |
| | | | | 244/59 |
| 6,377,207 | B1 * | 4/2002 | Solheim | G01W 1/02 |
| | | | | 324/640 |
| 6,935,119 | B2 | 8/2005 | Placko et al. | |
| 7,492,304 | B1 | 2/2009 | Woodell et al. | |
| 7,982,658 | B2 | 7/2011 | Kauffman et al. | |
| 8,068,050 | B2 | 11/2011 | Christianson | |
| 8,228,227 | B2 | 7/2012 | Bunch et al. | |
| 8,452,516 | B1 * | 5/2013 | Rose | F01D 17/162 |
| | | | | 701/100 |
| 8,490,404 | B1 | 7/2013 | Adibhatla et al. | |
| 8,869,537 | B2 | 10/2014 | Geis et al. | |
| 8,902,100 | B1 | 12/2014 | Woodell et al. | |
| 9,221,548 | B1 * | 12/2015 | Sishtla | B64D 43/00 |
| 9,244,166 | B1 * | 1/2016 | Finley | G01S 7/025 |
| 2009/0025393 | A1 | 1/2009 | Sheldon et al. | |
| 2013/0234884 | A1 * | 9/2013 | Bunch | G01W 1/00 |
| | | | | 342/26 B |
| 2013/0255221 | A1 | 10/2013 | Gaully et al. | |
| 2016/0011334 | A1 * | 1/2016 | Khatwa | G01W 1/00 |
| | | | | 702/3 |
| 2016/0230677 | A1 * | 8/2016 | Feulner | F02C 9/28 |
| 2016/0274271 | A1 * | 9/2016 | Lukas | G01W 1/02 |

OTHER PUBLICATIONS

Zhang et al., "A Method for Estimating Rain Rate and Drop Size Distribution from Polarimetric Radar Measurements," IEEE Transactions on Geoscience and Remote Sensing, vol. 39, No. 4, Apr. 2001, pp. 830-841.

Cao et al., "Analysis of Video Disdrometer and Polarimetric Radar Data to Characterize Rain Microphysics in Oklahoma," Journal of Applied Meteorology and Climatology, vol. 47, Aug. 2008, p. 2238-2255.

Noel et al., "Classification of Ice Crystal Shapes in Midlatitude Ice Clouds from Three Years of Lidar Observations over the SIRTA Observatory", Journal of the Atmospheric Sciences, vol. No. 63, pp. 2978-2991, Nov. 2006.

Great Britain Combined Search and Examination Report issued in connection with corresponding GB Application No. 1617979.8 dated Mar. 22, 2017.

Great Britain Combined Search and Examination Report issued in connection with related GB Application No. 1617856.8 dated Mar. 22, 2017.

Final Office Action issued in connection with related U.S. Appl. No. 14/927,788 dated Jun. 5, 2017.

Combined Search and Examination Report issued in connection with corresponding GB Application No. GB 1617979.8 dated Mar. 22, 2017.

Combined Search and Examination Report issued in connection with related GB Application No. 1617856.8 dated Mar. 22, 2017.

Noel, V., et al., "Classification of Ice Crystal Shapes in Midlatitude Ice Clouds from Three Years of Lidar Observations over the SIRTA Observatory," Journal of the Atmospheric Sciences, vol. 63, pp. 2798-2991 (2006).

Final Rejection towards related U.S. Appl. No. 14/927,788 dated Jun. 5, 2017.

* cited by examiner

ENHANCING ENGINE PERFORMANCE TO IMPROVE FUEL CONSUMPTION BASED ON ATMOSPHERIC RAIN CONDITIONS

FIELD OF THE INVENTION

The present subject matter relates generally to enhancing engine performance of an aircraft.

BACKGROUND OF THE INVENTION

An aircraft can include an engine, such as a gas turbine engine, for propulsion of the aircraft. A gas turbine engine can include a fan and a core arranged in flow communication with one another. The core of the gas turbine engine generally includes an air flow path having, in serial air flow order, a compressor section, a combustion section, a turbine section, and an exhaust section. The compressor section can include one or more compressors used to compress air. The compressed air can be provided to the combustion section where it is mixed with fuel and burned to provide combustion gases. The combustion gases can be used to support operation of the compressor section and the turbine section of the gas turbine engine.

During flight, an aircraft may encounter liquid water in the form of rain in the flight path of the aircraft. This typically occurs at altitudes when the aircraft is in takeoff, climb, or descent. Large amounts of liquid water ingested by the aircraft engine can be problematic as energy is expended to convert the water to vapor during the combustion process. This can lead to increased specific fuel consumption of the engine during climb and descent when rain is in the flight path of the aircraft.

For instance, the aircraft engine can include components associated with airflow geometry located in the airflow path of the core to control various aspects of the combustion process. For instance, stator vanes can be used to modify airflow to the compression and combustion sections of the gas turbine engine. Variable stator vanes can be controlled, for instance, based on temperature sensors located at different locations within the engine. Controlling the variable stator vanes based on temperature sensors may not adequately compensate for the presence of atmospheric liquid water ingested by the aircraft engine. For instance, the variable stator vanes can be controlled based on the temperature sensors to be more closed than they should be during the presence of atmospheric rain conditions, leading to increased fuel consumption.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of controlling an aircraft engine. The method includes identifying, by one or more computing devices, one or more points along a flight path of an aircraft. The method further includes receiving, by the one or more computing devices, a reflectivity measurement for each of the one or more points obtained using a device located on the aircraft. The method further includes determining, by the one or more computing devices, an estimate of liquid water content for each of the one or more points based at least in part on the reflectivity measurement for the point; and controlling, by the one or more computing devices, at least one component of the aircraft engine based at least in part on the estimate of liquid water content for the one or more points.

Other example aspects are directed to control systems, devices, aircraft, apparatus, and other systems configured to control at least one component of an engine based at least in part on an estimate of liquid water content. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
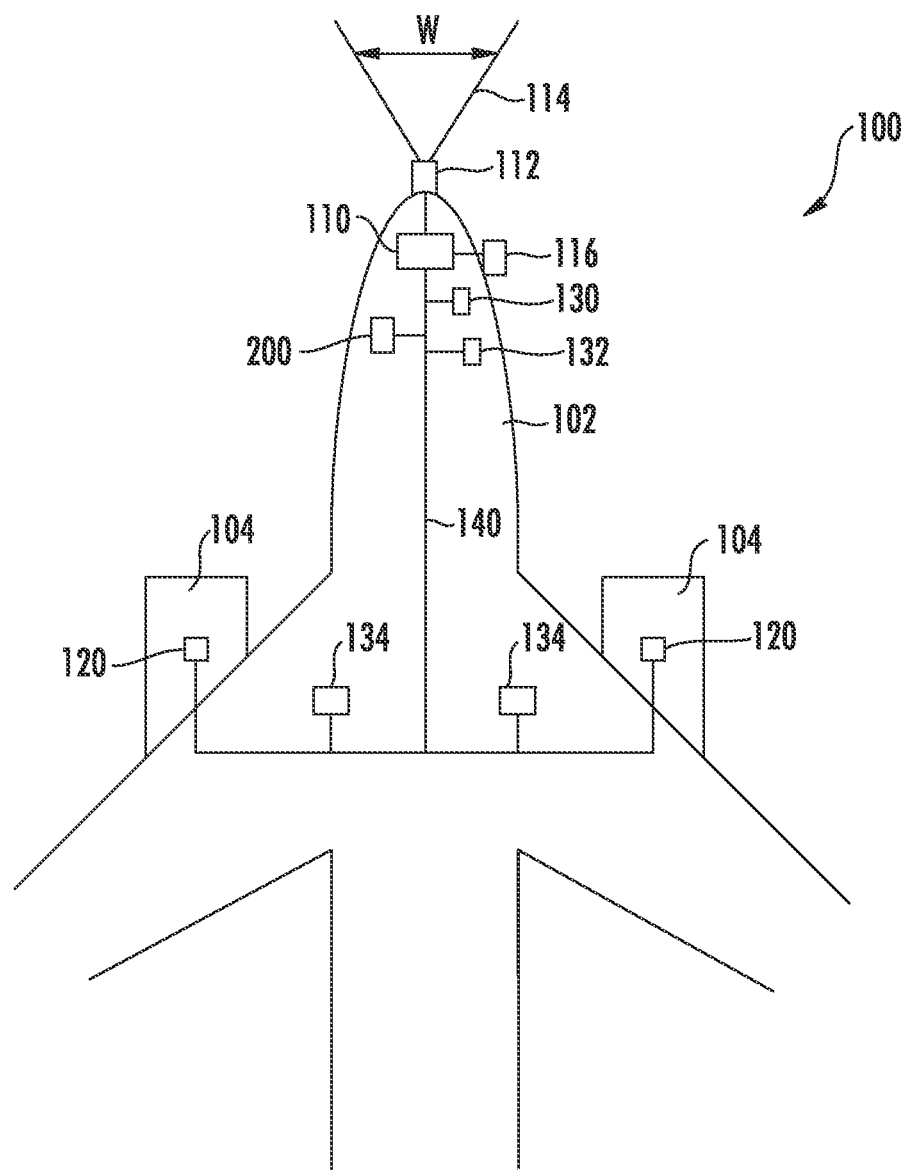
FIG. 1 depicts an overview of an example system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for improving engine performance by detecting atmospheric rain conditions. More particularly, liquid water in the form of rain in the flight path of the aircraft can be detected using reflectivity measurements obtained by a device (e.g., a radar device) located on the aircraft. A liquid water content estimation algorithm can be used to estimate the liquid water content (e.g., in units of grams of mass per meter cubed of volume $g/m^3$) based on reflectivity measurements for points along the flight path of the aircraft. One or more components (e.g., variable stator vanes) of the aircraft engine can be controlled based at least in part on the estimated liquid water content to improve fuel flow of the aircraft in atmospheric rain conditions, such as rain conditions encountered during takeoff, climb and descent of the aircraft.

Liquid water content estimation can be particularly applicable during ambient temperatures when rain conditions can be encountered. The highest altitude where rain is encountered can be an altitude where the ambient temperature becomes 0° C. Example aspects of the present disclosure can use ambient temperature data (e.g., collected by an ambient temperature sensor associated with the aircraft or other data) to determine when to operate the system in a liquid water content detection mode. For instance, the aircraft can perform liquid water content estimation in a liquid water content detection mode according to example aspects of the present disclosure when the ambient temperature is greater than 0° C. or other threshold.

When a liquid water content estimation mode is engaged, the systems and methods according to example aspects of the present disclosure can estimate liquid water content for points along the flight path of the aircraft based on reflectivity measurements. More particularly, points along the flight path to be encountered by the aircraft within a specified time period (e.g., points to be traversed by the aircraft within the next one minute) can be identified at a particular resolution. Reflectivity measurements can be obtained for the identified points.

An estimate of liquid water content for each of the identified points can be determined based on the reflectivity measurements using a liquid water content estimation algorithm. For instance, parameters for a drop size distribution model can be determined and used to estimate the liquid water content based on the reflectivity measurement for the point.

In some embodiments, a plurality of estimated values for each point can be obtained as the aircraft travels along the flight path. Each estimated value can be associated with an instance of a reflectivity measurement. The estimate of liquid water content can be refined as the aircraft travels along the flight path from the plurality of estimated values using a weighted averaging function. The weighted averaging function can assign greater weight to estimated values associated with reflectivity measurements for points closer to the aircraft as the reflectivity measurements are typically more accurate. In this way, the estimate of liquid water content can be continuously improved as the aircraft moves closer to the point.

Once the estimate of liquid water content for a point is obtained, the estimate can be used to control one or more components associated with the aircraft engine, for instance, to improve fuel performance. For instance, one or more components associated with the airflow geometry (e.g., inlet guide vanes, variable stator vanes, etc.) can be controlled to regulate the amount of pressure in the aircraft engine to improve fuel performance.

In particular implementations, the variable stator vanes associated with the aircraft engine can be controlled based on the estimate of liquid water content. For instance, adjustments can be made to variable stator vane positions specified by a nominal schedule based at least in part on the estimate of liquid water content to regulate the airflow in the aircraft engine. In one embodiment, the variable stator vanes can be controlled to be more open relative to a position specified by a nominal schedule when the estimate of liquid water content exceeds a threshold.

In this way, example aspects of the present disclosure can have a technical effect of providing for improved performance of an aircraft engine when the aircraft encounters atmospheric rain in the flight path of the aircraft. Providing more efficient control of the aircraft engine (e.g., more efficient control of the variable stator vanes) based on estimates of liquid water content can lead to increased efficiency in fuel consumption, potentially leading to fuel savings for operation of the aircraft. In addition, the estimation of liquid water content according to example aspects of the present disclosure can be performed using devices (e.g., radar devices) located on many different types of aircraft, resulting in wide range applicability for use by aircraft in improving engine performance.

FIG. 1 depicts an example system 100 for controlling one or more components of an aircraft engine to improve engine performance according to example aspects of the present disclosure. As shown, the system 100 can include a control system having one or more computing device(s) 200 (e.g., a computer based control system) or other control equipment associated with, for instance, an avionic system of the aircraft 102. The computing device(s) 200 can be coupled to a variety of systems on the aircraft 102 over a communications network 140. The communications network 140 can include a data bus and/or combination of wired and/or wireless communication links.

The system 100 can include a radar device 112 associated with the aircraft 102. The radar device 112 can be configured to obtain radar reflectivity measurements. The radar device 112 can emit a radar beam 114 (e.g., radio waves) and measure reflectivity of the radar beam 114 off of objects (e.g., liquid water particles) in the flight path of the aircraft 102. The radar device 112 can emit a radar beam 114 having a radar beam width W as illustrated in FIG. 1. The radar device 112 can obtain reflectivity measurements in dBZ (e.g., decibel relative to Z). These reflectivity measurements can compare the equivalent reflectivity (Z) of a radar signal to the return of a droplet of rain with a diameter of 1 mm. In some embodiments, the radar device 112 can be associated with an onboard weather system 110 for the aircraft 102. In some embodiments, the radar device 112 can be an X-band radar device (e.g., associated with a frequency range of 7.0 to 11.2 gigahertz (GHz)).

The present disclosure is discussed with reference to performing reflectivity measurements using a radar device located on the aircraft for purposes of illustration and discussion. Those of ordinary skill in the art, using the disclosures provided herein, will understand that other types of devices can be used to obtain the reflectivity measurements. For instance, a lidar device or other reflectivity based technology can be used to obtain the reflectivity measurements.

The system 100 can further include a temperature sensor 116 associated with the aircraft 102. The temperature sensor 116 can measure the ambient temperature around the aircraft 102 while the aircraft is in flight. Similar to the radar device 112, the ambient temperature sensor 116 can be associated with the onboard weather system 110 for the aircraft 102.

According to example embodiments of the present disclosure, the computing device(s) 200 can access data from the onboard weather system 110 (e.g., radar reflectivity measurements and ambient temperature data) and use the data to control one or more components of the aircraft to increase fuel performance. More particularly, the computing device(s) 200 can control components associated with aircraft engines 104 used for propulsion of the aircraft 102 to increase fuel performance based on the data accessed from the onboard weather system 110.

More particularly, as illustrated in FIG. 1, the computing device(s) 200 can be in communication with engine control systems 120 associated with the aircraft engines 104. Aircraft engines 104 can be, for instance, gas turbine engines. The engine control systems 120 can be configured to control components of the aircraft engines 104 in response to commands from the computing device(s) 200. For instance, the engine control system 120 can adjust components associated with an airflow geometry of the aircraft engines 104 (e.g., vanes in the airflow path of the aircraft engines 104) based on commands from the computing device(s) 200. In one embodiment, the engine control systems 120 can control variable stator vanes associated with the aircraft engines 104 to be more open or more closed based on commands from the computing device(s) 200. The commands from the computing device(s) 200 can be determined based at least in part on the radar reflectivity measurements obtained by the radar device 112 as will be discussed more detail below.

In some embodiments, the computing device(s) 200 can be in communication with other aircraft systems over the communications network 140. The aircraft systems can include, for instance a display system 130 including one or more display devices that can be configured to display or otherwise provide information generated or received by the system 100 to operators of the aircraft 102. The display system 130 can include a primary flight display, a multipurpose control display unit, or other suitable flight display commonly included within a cockpit of the aircraft 102. By way of non-limiting example, the display system 130 can be used for displaying flight information such as airspeed, altitude, attitude, and bearing of the aircraft 102.

The computing device(s) can also be in communication with a flight control computer 132. The flight control computer 132 can, among other things, automate the tasks of piloting and tracking the flight plan of the aircraft 102. The flight control computer 132 can include or be associated with, any suitable number of individual microprocessors, power supplies, storage devices, interface cards, auto flight systems, flight management computers, and other standard components. The flight control computer 132 can include or cooperate with any number of software programs (e.g., flight management programs) or instructions designed to carry out the various methods, process tasks, calculations, and control/display functions necessary for operation of the aircraft 102. The flight control computer 132 is illustrated as being separate from computing device(s) 200. Those of ordinary skill in the art, using the disclosures provided herein, will understand that the flight control computer 132 can also be included with or implemented by the computing device(s) 200.

The computing device(s) 200 can also be in communication with various other aircraft systems 134. The aircraft systems 134 can include, for instance, digital control systems, throttle systems, inertial reference systems, flight instrument systems, auxiliary power systems, fuel monitoring system, engine vibration monitoring systems, communications systems, flap control systems, flight data acquisition systems, and other systems.

Figure 2:
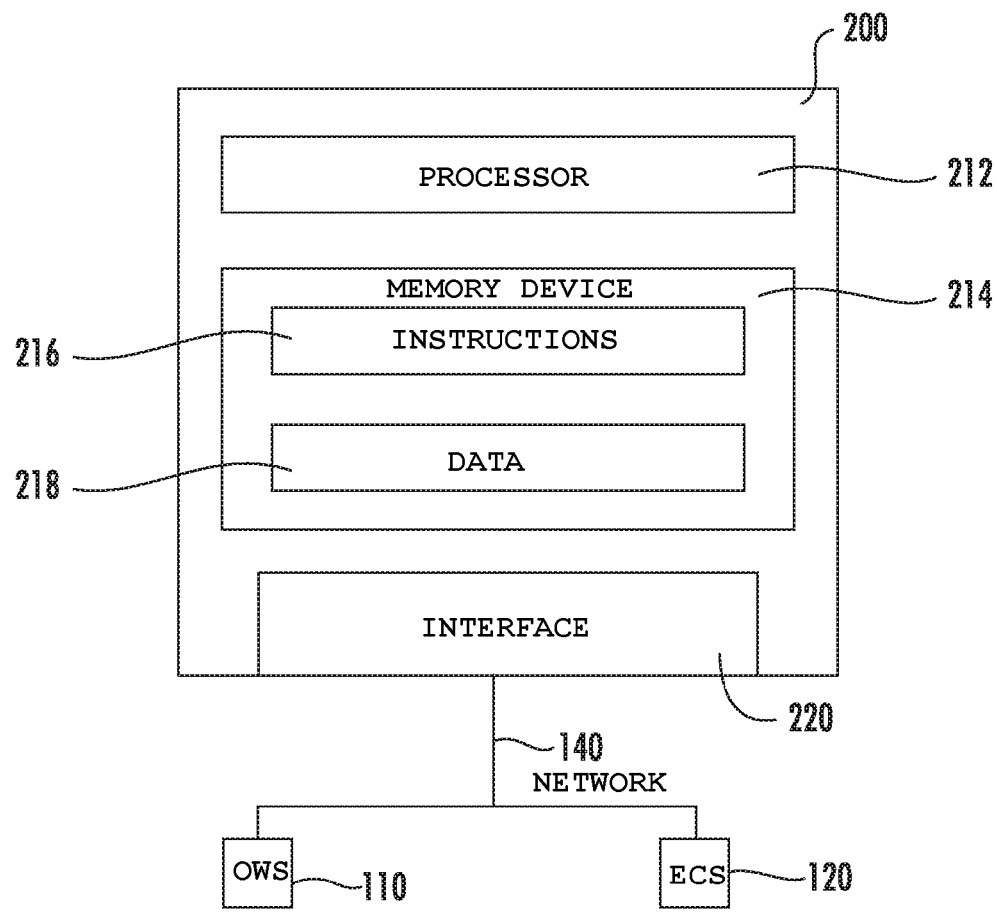
FIG. 2 depicts an example computing device used in a control system according to example embodiments of the present disclosure.

FIG. 2 depicts various components of the computing device(s) 200 according to example embodiments of the present disclosure. As shown, the computing device(s) 200 can include one or more processors 212 and one or more memory devices 214. The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices.

The one or more memory devices 214 can store information accessible by the one or more processors 212, including computer-readable instructions 216 that can be executed by the one or more processors 212. The instructions 216 can be any set of instructions that when executed by the one or more processors 212, cause the one or more processors 212 to perform operations. The instructions 216 can be implemented in software written in any suitable programming language or can be implemented in hardware. In some embodiments, the instructions 216 can be executed by the one or more processors 212 to cause the one or more processors to perform operations, such as the operations for determining liquid water content and controlling one or more components of an aircraft engine as described with reference to FIG. 3.

Referring to FIG. 2, the memory devices 214 can further store data 218 that can be accessed by the processors 212. The data 218 can include, for instance, radar reflectivity data, ambient temperature measurements, estimated liquid water content, and other data. The data 218 can also include data associated with models and algorithms used to perform the example methods according to example aspects of the present disclosure, such as drop size distribution models and algorithms for estimating liquid water content.

The computing device(s) 200 can further include a communications interface 220. The communications interface 220 can be configured to communicate with aircraft systems over a communication network, such as communications network 140 of FIG. 1. For instance, the communications interface 220 can receive radar reflectivity measurements and ambient temperature measurements from an onboard weather system 110. The communications interface 220 can provide control commands to engine control systems 120. The communications interface 220 can include any suitable components for interfacing with one more other devices, including for example, transmitters, receivers, ports, controllers, antennas, or other suitable components.

The technology discussed herein makes computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 3:
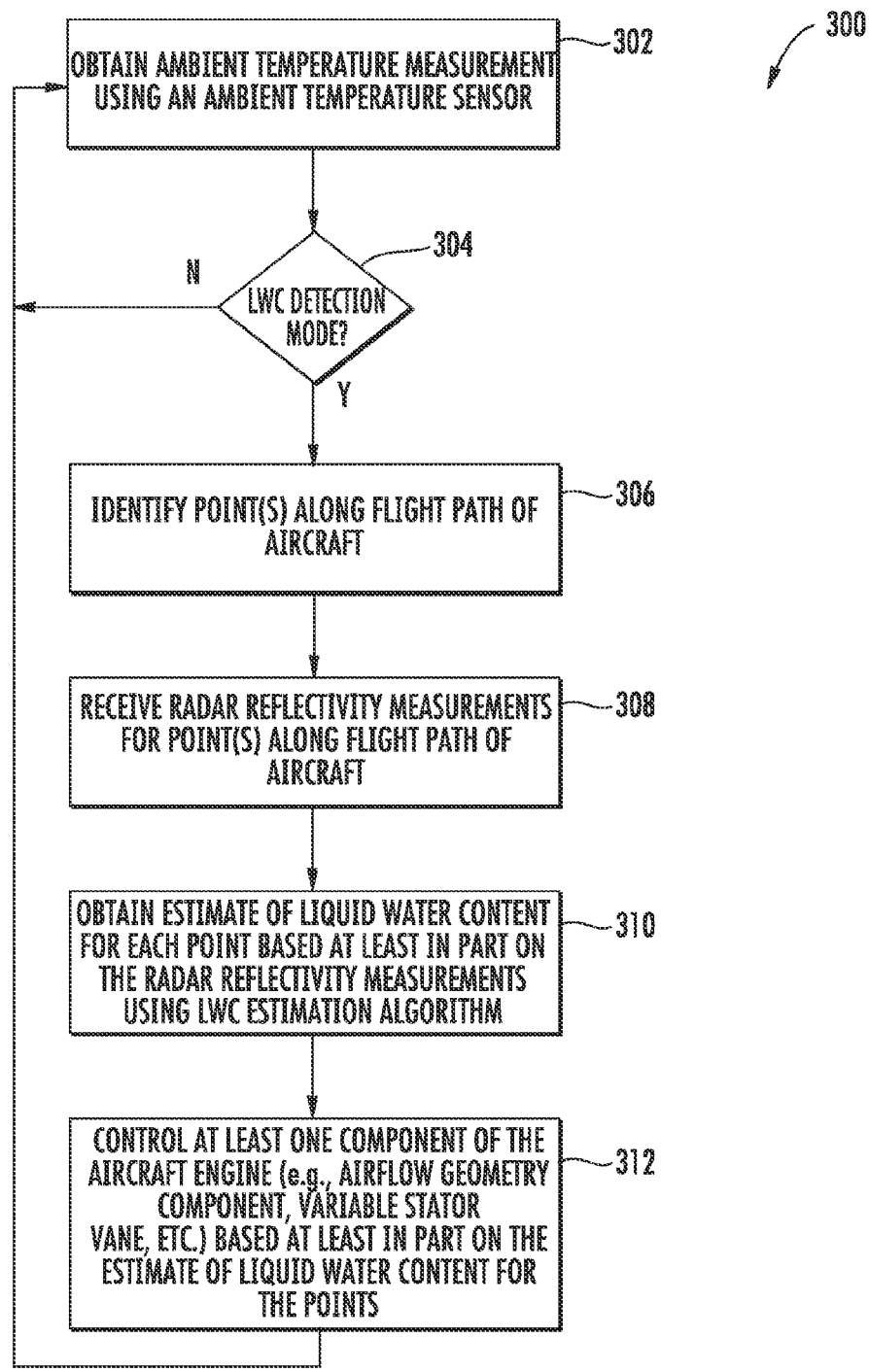
FIG. 3 depicts a flow diagram of an example method according to example embodiments of the present disclosure.

FIG. 3 depicts a flow diagram of an example method (300) according to example embodiments of the present disclosure. The method (300) can be implemented using one or more computing devices, such as the computing device(s) 200 of FIGS. 1 and 2. The method or portions of the method can be implemented at least in part by other devices, such as processors associated with the radar device 112 or other component(s) without deviating from the scope of the present disclosure. In addition, FIG. 3 depicts steps performed in a particular order for purposes of illustration and discussion. Those of ordinary skill in the art, using the disclosures provided herein, will understand that various steps of any of the methods disclosed herein can be modified, rearranged, omitted, expanded, and/or adapted in various ways without deviating from the scope of the present disclosure.

At (302), the method includes obtaining an ambient temperature measurement using an ambient temperature sensor. For instance, an ambient temperature measurement from the ambient temperature sensor 116 equipped on the aircraft 102 can be accessed. The ambient temperature measurement can be obtained from other suitable sources without deviating from the scope of the present disclosure. For instance, the ambient temperature measurement can be based on data stored in an onboard weather system for the aircraft.

At (304), the method determines whether to engage the liquid water content detection mode based on the ambient temperature measurement. For instance, when the ambient temperature measurement is greater than a threshold ambient temperature, the method can include engaging the liquid water content detection mode to control the aircraft based on detected liquid water content as will be discussed in more detail below. Otherwise, the method can continue to monitor the ambient temperature until the ambient temperature measurement exceeds the ambient temperature threshold.

As discussed above, an aircraft is likely to encounter liquid water in the atmosphere at altitude where the ambient temperature is 0° C. Accordingly, in one embodiment, the method can include engaging the LWC detection mode when the ambient temperature measurement is greater than 0° C. Other suitable thresholds can be used without deviating from the scope of the present disclosure. For instance, the threshold can be about 10° C., 5° C., 2.5° C., or other suitable threshold without deviating from the scope of the present disclosure. As used herein, the use of the term "about" in conjunction with an numerical value is intended to refer to within 30% of the numerical value.

When the liquid water detection mode is engaged, the method can include identifying one or more points along the flight path of the aircraft as shown at (306) of FIG. 3. More particularly, from the current flight path, one or more points (e.g., each associated with a latitude/longitude/altitude) can be selected from along the flight path of the aircraft at an arbitrary resolution value. The resolution value can be indicative of the number of points and/or spacing of points to be identified along the flight path The identified points can be within the radar beam width associated with radar device equipped on the aircraft. The points can be selected in a range corresponding to a time period in which the minimum is associated with the nearest point for which a radar reflectivity measurement can be obtained and the maximum is a point estimated to be encountered by the aircraft a certain time period ahead in the flight path (e.g., encountered by the aircraft within the 1 minute along the flight path) provided that point falls within the radar beam width.

Figure 4:
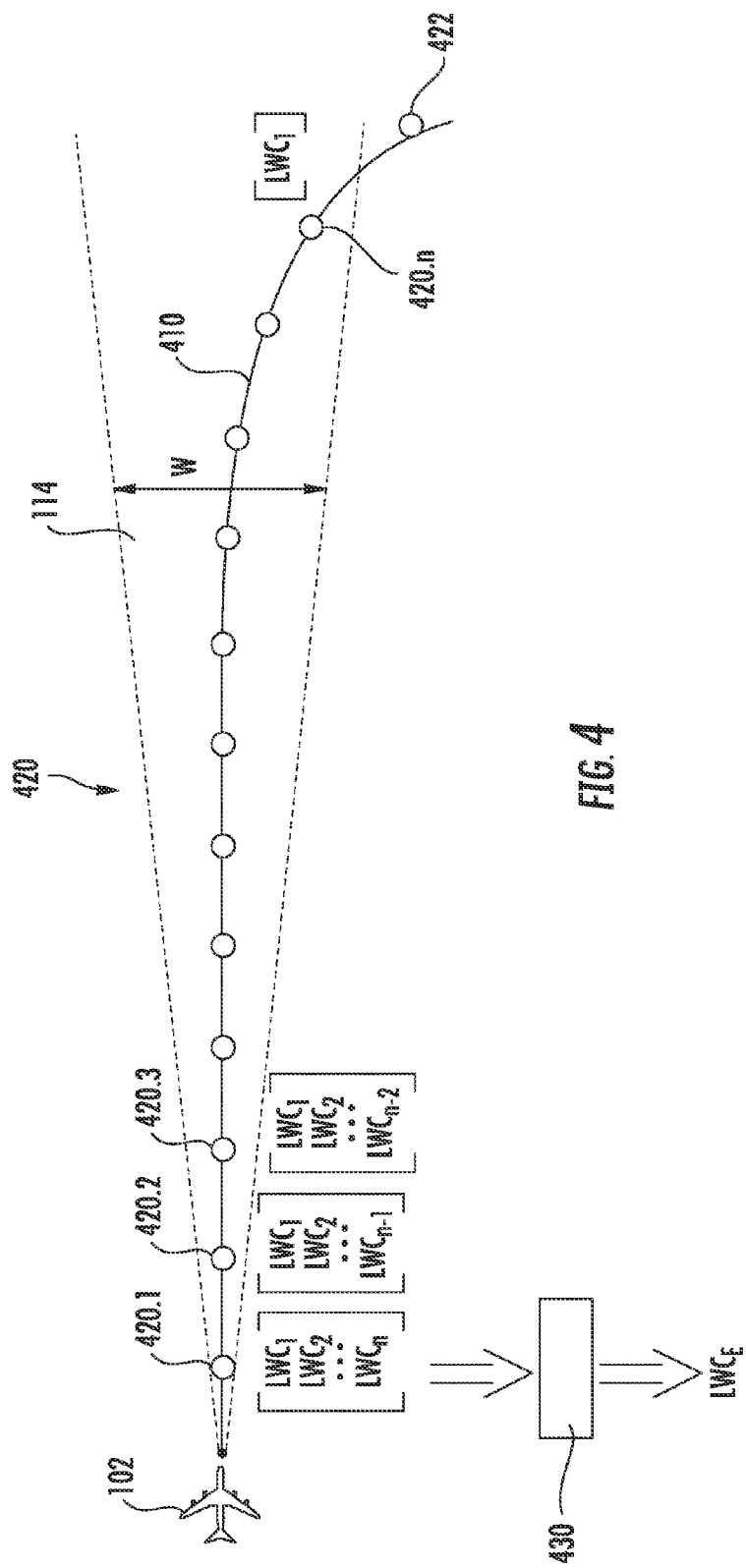
FIG. 4 depicts the example determination of liquid water content for a plurality of points using reflectivity measurements according to example embodiments of the present disclosure.

For example, FIG. 4 depicts a plurality of points 420 identified along a flight path 410. The plurality of points 420 are represented as dots along the line corresponding to the flight path 410. The points 420 can each be associated with a latitude/longitude/altitude). The resolution of points 420 can be identified according to any suitable resolution value. The points 420 can be within a radar beam width W associated with the radar beam 114 emitted by the radar device 112 equipped on the aircraft 102. For instance, point 422 along the flight path is outside the radar beam width W of the radar beam W emitted by the radar device 112 equipped on the aircraft and, in some embodiments, is not identified for inclusion in the plurality of points.

Referring to FIG. 3 at (308), the method can include receiving radar reflectivity measurements for each of the one or more points along the flight path of the aircraft. For instance, a radar reflectivity measurement (e.g., in dBZ) can be obtained for each of the points 420 along the flight path 410 of aircraft 102.

At (310) of FIG. 3, the method includes determining an estimate of liquid water content for the point(s) based at least in part on the radar reflectivity measurements for the points. The estimate of liquid water content can also be based on other data, such as reflectivity measurements obtained from other sources (e.g., other aircraft) and/or weather data obtained from a weather service. In one example embodiment, the radar reflectivity measurement for each point can be provided to a liquid water content estimation algorithm which can generate an estimated value for the point. Details concerning an example liquid water content estimation algorithm will be discussed below with reference to FIG. 5.

In a particular example implementation, the determination of liquid water content for each of the plurality of points can be determined continuously to give a path-wise array of liquid water content in the air mass ahead of the aircraft. For instance, a set of estimated values for each of the one or more points can be determined as the aircraft travels along the flight path. Each estimated value can be associated with an instance of the radar reflectivity measurement for the point and can be determined using the liquid water content estimation algorithm. This can build a set of estimated values for the points along the flight path with the nearest point having the most estimated values and the farthest point having only one value.

For example, as shown in FIG. 4, the nearest point 420.1 can have liquid water content estimated values $LWC_1$, $LWC_2$, ... $LWC_N$. The next nearest point 420.2 can have one less estimated value than the nearest point 420.1. More particularly, the next nearest point 420.2 can have liquid water content estimated values $LWC_1$, $LWC_2$, ... $LWC_{N-1}$. The next nearest point 420.3 can have one less estimated value than the nearest point 420.2. More particularly, the next nearest point 420.2 can have liquid water content estimated values $LWC_1$, $LWC_2$, ... $LWC_{N-2}$. The next nearest point can have one less estimated value than 420.3, and so forth. The farthest point 420.n can have one estimated value $LWC_1$.

For each point, a weighted averaging function can be applied to the estimated values to determine the estimate of liquid water content for the point. For instance, as shown in FIG. 4, the estimated values $LWC_1$, $LWC_2$, ... $LWC_N$ can be provided to a weighted averaging function 430 to determine an estimate of liquid water content $LWC_E$ for the point 420.1. The weighted averaging function 430 can assign greater weight to estimated values associated with more accurate radar reflectivity measurements. For instance, the weighted averaging function 430 can assign greater weight to estimated values for instances of the radar reflectivity measurements obtained for points closer to the aircraft.

Referring to FIG. 3 at (312), the method can include controlling at least one component of the aircraft engine based at least in part on the estimate of liquid water content for the points. For example, in one embodiment, components associated with the airflow geometry of the aircraft engine (e.g., inlet guide vanes, variable stator vanes, etc.) can be adjusted based on the estimate of liquid water content to adjust the airflow pressure in the aircraft engine to accommodate for the presence of liquid water content in the airflow path and to improve fuel consumption.

As one example, variable stator vanes associated with the aircraft engine can be adjusted to be more open or more closed than normally specified, for instance, by a nominal schedule based at least in part on the estimate of liquid water content. For instance, if the estimate of liquid water content exceeds a threshold, the variable stator vanes can be controlled to be more open than normally specified by a nominal variable stator vane position schedule.

Figure 5:
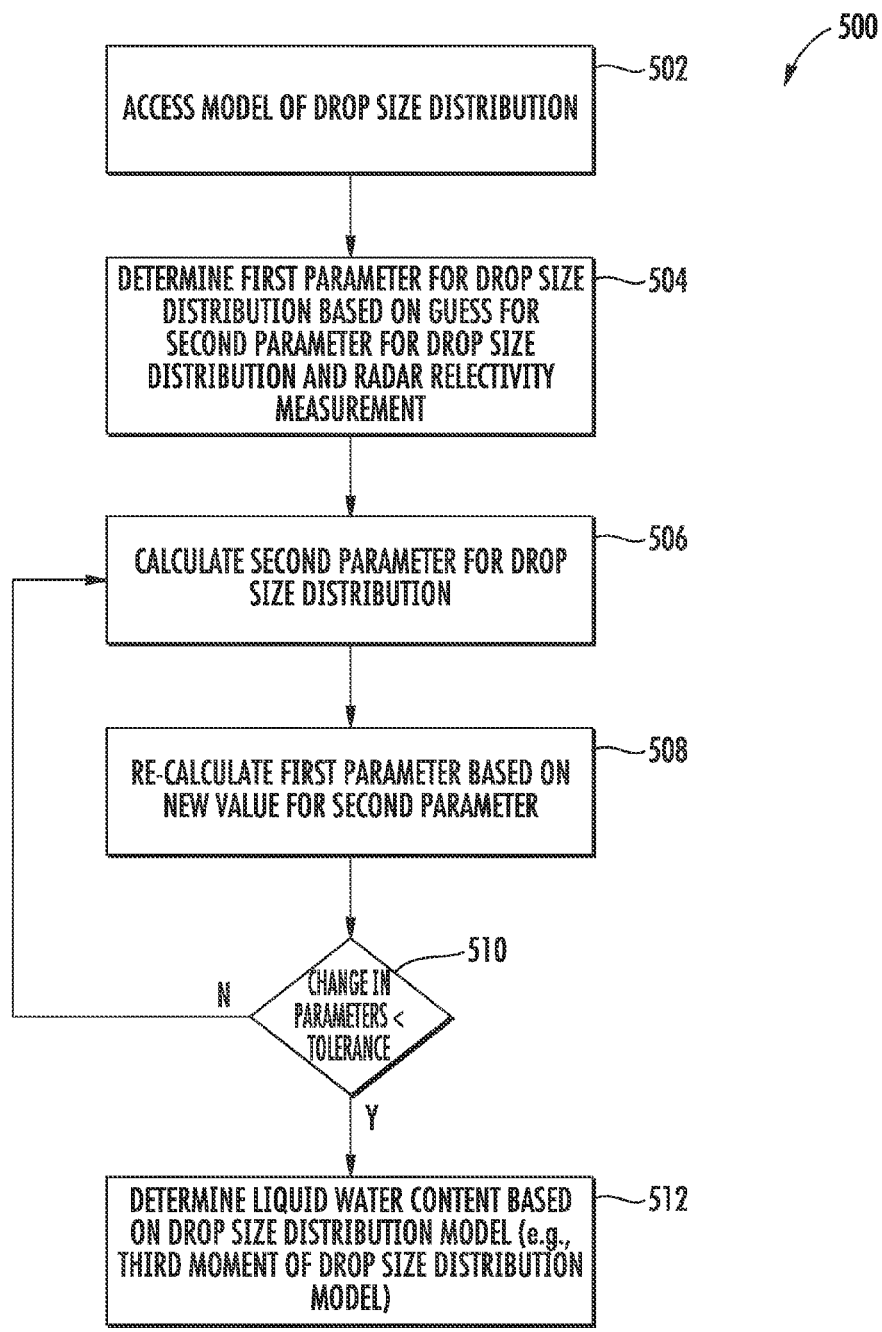
FIG. 5 depicts a flow diagram of an example liquid content estimation algorithm according to example embodiments of the present disclosure.

FIG. 5 depicts a flow diagram of one example liquid water content estimation algorithm (500) according to example embodiments of the present disclosure. The liquid water content estimation algorithm can determine liquid water content based on radar reflectivity measurements using a drop size distribution model for water droplets.

At (502), the method can include accessing a model of drop size distribution. More particularly, as shown in FIG. 5, radar reflectivity can be proportional to the sum of the sixth power of the diameters of the water droplets. Accordingly, a drop size distribution model can be defined based on radar reflectivity as follows:

$$Z = \int D^6 n(D) dD = N\Lambda^{-(\mu+7)} \Gamma(\mu+7)$$

where Z is the radar reflectivity measurement, D is the drop size distribution, N is the number of droplets, $\Lambda$ is a first parameter associated with the model, $\mu$ is a second parameter associated with the model, and $\Gamma$ is the gamma function associated with the drop size distribution. Based on a best guess as to the value N of 50,000, and a relationship between $\mu$ and $\Lambda$, parameters for the model can be solved using the system of the following equations:

$$\begin{cases} Z_{measured} = N\Lambda^{-(\mu+7)} \Gamma(\mu+7) \\ \mu = C1\Lambda^2 + C2\Lambda + C3 \\ N = 50000 \end{cases}$$

where $Z_{measured}$ is the radar reflectivity measurement and C1, C2 and C3 are constants associated with the relationship between $\mu$ and $\Lambda$.

At (504), a value for a first parameter $\Lambda$ is determined using the above system of equations based on an initial guess for $\mu$. At (506), a value for a second parameter $\mu$ is calculated using the value determined for the first parameter $\Lambda$. The first parameter $\Lambda$ is then recalculated using the determined value for the second parameter $\mu$ at (508).

At (510), it is determined whether difference in value of the calculated first parameter $\Lambda$ and the previously calculated value for the first parameter $\Lambda$ is less than a tolerenace. If not, the parameters are re-determined in accordance with (506) and (508). If so, the method continues to (512) where the estimate of liquid water content is determined based on the drop size distribution model. For instance, from the solved parameters, the algorithm can calculate the liquid water content based on the third moment of the distribution. More specifically, the liquid water content can be calculated as follows:

$$LWC = \rho \frac{\pi}{6*10^6} \int D^3 n(D) dD = \rho \frac{\pi}{6*10^6} N\Lambda^{-(\mu+4)} \Gamma(\mu+4)$$

where $\rho$ is the density of the drops (e.g., measured in g/m$^3$) and can be assumed to be 1000 g/m$^3$.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling an aircraft engine, comprising:
   identifying, by one or more processors, one or more points along a flight path of an aircraft;
   accessing, by the one or more processors, a reflectivity measurement for each of the one or more points, the reflectivity measurement obtained from a device located on the aircraft;
   determining, by the one or more processors, an estimate of liquid water content for each of the one or more points based at least in part on the reflectivity measurement for the point, wherein determining an estimate of liquid water content for each of the one or more points comprises:
      determining, by the one or more processors, a set of estimated values for each of the one or more points as the aircraft travels along the flight path, each estimated value in the set of estimated values associated with an instance of a radar reflectivity measurement for the point; and
      determining, by the one or more processors, the estimate of liquid water content based at least in part on the set of estimated values; and
   controlling, by the one or more processors, at least one component of the aircraft engine based at least in part on the estimate of liquid water content for the one or more points.

2. The method of claim 1, wherein the at least one component comprises a component associated with an airflow geometry of the aircraft engine.

3. The method of claim 2, wherein the component associated with the airflow geometry of the aircraft engine comprises one or more variable stator vanes of the aircraft engine.

4. The method of claim 1, wherein the reflectivity measurement for each of the one or more points comprises a radar reflectivity measurement obtained from a radar device.

5. The method of claim 1, wherein the estimate of liquid water content is determined based on a radar reflectivity measurement using a liquid water content estimation algorithm, the liquid water content estimation algorithm comprising:
   estimating, by the one or more processors, one or more parameters for a drop size distribution model based at least in part on the radar reflectivity measurement; and
   determining, by the one or more processors, the estimate of liquid water content based at least in part on the parameters for the drop size distribution model.

6. The method of claim 1, wherein controlling, by the one or more processors, at least one component of the aircraft engine based at least in part on the estimate of liquid water content is performed when the aircraft is operating in a liquid water content detection mode.

7. The method of claim 6, wherein the method comprises:
obtaining, by the one or more processors, an ambient temperature measurement using a temperature sensor; and
activating, by the one or more processors, the liquid water content detection mode based at least in part on the ambient temperature.

8. The method of claim 1, wherein the estimate of liquid water content is determined based at least in part on reflectivity measurements obtained from other aircraft or based at least in part on weather data.

9. The method of claim 1, wherein the estimate of liquid water content is determined based at least in part on the set of estimated values using a weighted averaging function, the weighted averaging function assigning greater weight to estimated values associated with instances of the radar reflectivity measurement obtained for points closer to the aircraft.

10. A system for controlling an aircraft engine of an aircraft, comprising:
a radar device located on the aircraft, the radar device configured to obtain radar reflectivity measurements for an air volume within a radar beam width associated with the radar device;
a control system comprising one or more processors and one or more memory devices, the one or more memory devices storing computer-readable instructions that when executed by the one or more processors cause the one or more processors to perform operations, the operations comprising:
identifying a plurality of points along a flight path of an aircraft;
accessing a radar reflectivity measurement for each of the plurality of points obtained using the radar device;
determining an estimate of liquid water content for each of the plurality of points based at least in part on the radar reflectivity measurement for the point, wherein the operation of determining an estimate of liquid water content for each of the plurality of points comprises:
determining a set of estimated values for each of the plurality of points as the aircraft travels along the flight path, each estimated value in the set of estimated values associated with an instance of a radar reflectivity measurement for the point; and
determining the estimate of liquid water content based at least in part on the set of estimated values; and
controlling at least one component of the aircraft engine based at least in part on the estimate of liquid water content for at least one of the plurality of points.

11. The system of claim 10, wherein the control system is configured to control the at least one component of the aircraft engine based at least in part on the estimate of liquid water content when the control system is operating in a liquid water content detection mode, wherein the control system is configured to trigger operation in the liquid water content detection mode based at least in part on an ambient temperature measurement obtained by a temperature sensor in communication with the control system.

12. The system of claim 10, wherein the at least one component comprises a component associated with an airflow geometry of the aircraft engine.

13. The system of claim 12, wherein the component associated with the airflow geometry of the aircraft engine comprises one or more variable stator vanes of the aircraft engine.

14. The system of claim 10, wherein the estimate of liquid water content is determined based on the radar reflectivity measurement using a liquid water content estimation algorithm, the liquid water content estimation algorithm comprising:
estimating one or more parameters for a drop size distribution model based at least in part on the radar reflectivity measurement; and
determining the estimate of liquid water content based at least in part on the parameters for the drop size distribution model.

* * * * *